US009103592B2

(12) United States Patent  (10) Patent No.: US 9,103,592 B2
Gonzalez et al.  (45) Date of Patent: *Aug. 11, 2015

(54) BURNER WITH VELOCITY ADJUSTMENT FOR FLASH SMELTER

(75) Inventors: Victor Gonzalez, San Manuel, AZ (US); George Franks, Tuscon, AZ (US); Alan Mallory, Barrie (CA); Thomas W. Gonzales, Tuscon, AZ (US); Robert Veenstra, Mississauga (CA)

(73) Assignee: Hatch Ltd., Ontario (CA)

( * ) Notice: Subject to any disclaimer, the term of this patent is extended or adjusted under 35 U.S.C. 154(b) by 235 days.

This patent is subject to a terminal disclaimer.

(21) Appl. No.: 13/464,440

(22) Filed: May 4, 2012

(65) Prior Publication Data

US 2012/0280439 A1 Nov. 8, 2012

Related U.S. Application Data

(60) Provisional application No. 61/483,432, filed on May 6, 2011, provisional application No. 61/539,594, filed on Sep. 27, 2011.

(51) Int. Cl.
| | |
|---|---|
| *F27D 3/18* | (2006.01) |
| *F27B 3/20* | (2006.01) |
| *C22B 15/00* | (2006.01) |
| *F27D 9/00* | (2006.01) |
| *F27D 99/00* | (2010.01) |
| *C21C 5/52* | (2006.01) |

(52) U.S. Cl.
CPC ............. *F27B 3/205* (2013.01); *C22B 15/0047* (2013.01); *F27D 9/00* (2013.01); *F27D 99/0033* (2013.01); *C21C 5/5217* (2013.01)

(58) Field of Classification Search
CPC ........... F27D 21/02; F27D 3/18; F27D 99/00; F27D 9/00; F27D 99/0033; F23D 1/00; F23D 17/00; C21B 5/001; C21B 5/00; C21C 5/5217; F27B 3/205; C22B 15/0047
USPC ............ 266/100, 200, 241, 221, 267; 75/455, 75/454, 707
See application file for complete search history.

(56) References Cited

U.S. PATENT DOCUMENTS

| | | | |
|---|---|---|---|
| 2,380,041 | A | 7/1945 | Hardgrove |
| 4,210,315 | A | 7/1980 | Lilja et al. |
| 4,331,087 | A | 5/1982 | Kunttu et al. |
| 4,392,885 | A | 7/1983 | Lilja et al. |
| 5,133,801 | A | 7/1992 | Sarrinen |
| 5,358,222 | A | 10/1994 | Kaasinen et al. |
| 5,362,032 | A | 11/1994 | Ranki |
| 5,370,369 | A | 12/1994 | Lilja et al. |
| 5,542,361 | A | 8/1996 | Lilja et al. |

(Continued)

FOREIGN PATENT DOCUMENTS

| | | |
|---|---|---|
| GB | 1569813 A | 6/1980 |
| SU | 422280 | 11/1977 |

*Primary Examiner* — Scott Kastler
*Assistant Examiner* — Michael Aboagye
(74) *Attorney, Agent, or Firm* — Fox Rothschild LLP

(57) ABSTRACT

A burner for a flash smelting furnace. The burner has an adjustable nozzle to control the velocity of the combustion gas supply to the reaction shaft. The nozzle is defined by the burner injector and a surrounding structure that extends from the burner wind box through an opening in the burner block that integrates the burner with the furnace. The nozzle is adjusted by control means that is exterior of the wind box.

18 Claims, 20 Drawing Sheets

(56) References Cited

U.S. PATENT DOCUMENTS

| | | | |
|---|---|---|---|
| 5,674,310 A | 10/1997 | Miralles et al. | |
| 6,238,457 B1 * | 5/2001 | Holmi et al. | 75/455 |
| 6,565,799 B1 | 5/2003 | Kojo et al. | |
| 2009/0246113 A1 | 10/2009 | Endoh et al. | |
| 2010/0207307 A1 | 8/2010 | Sipila et al. | |

* cited by examiner

21

12

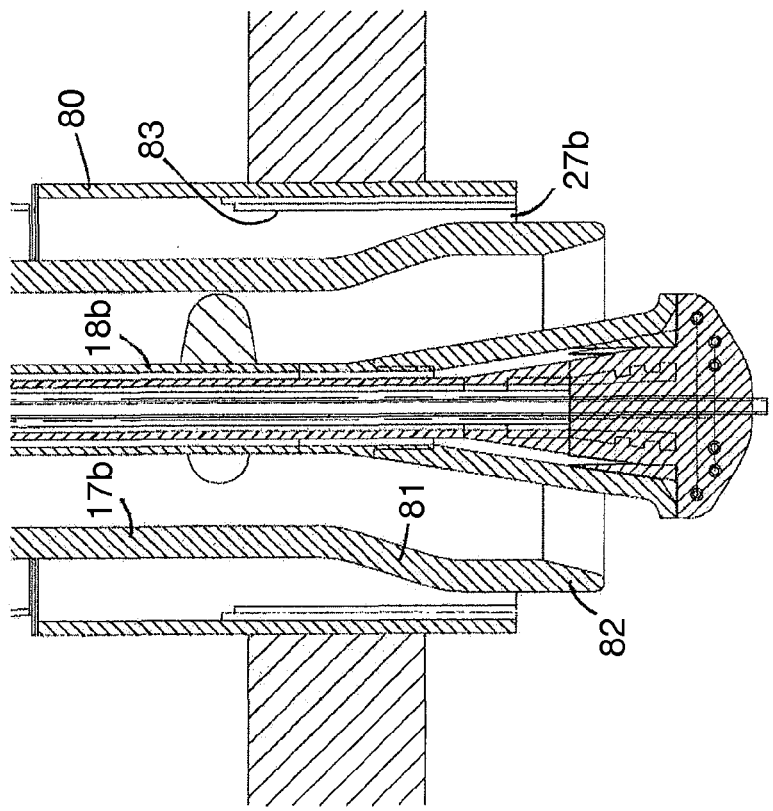
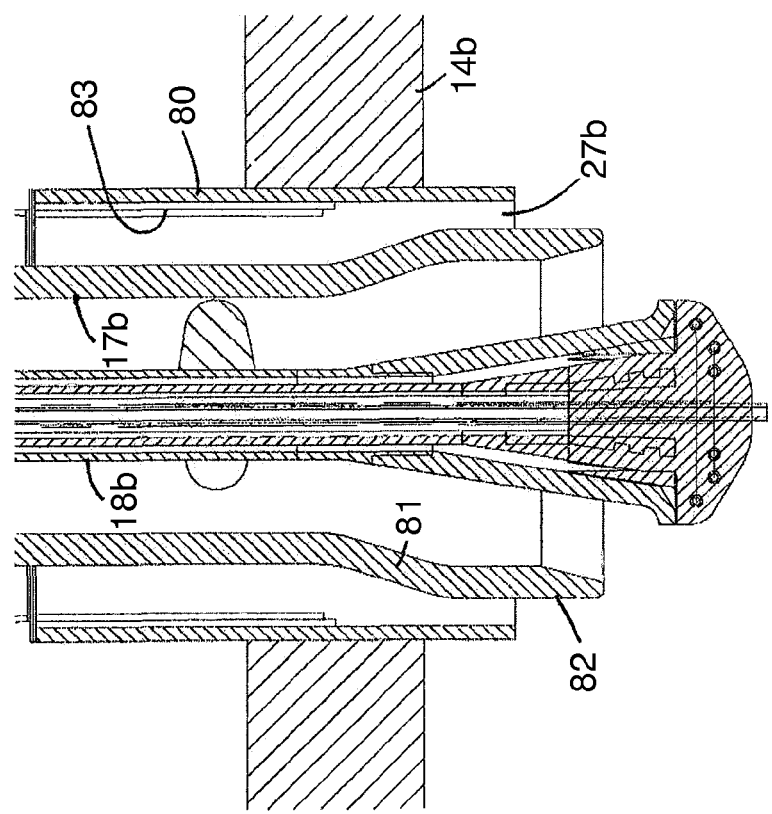

BURNER WITH VELOCITY ADJUSTMENT FOR FLASH SMELTER

This application claims the benefit of U.S. provisional application No. 61/483,432 filed on May 6, 2011, and U.S. provisional application No. 61/539,594 filed on Sep. 27, 2011.

TECHNICAL FIELD

The present subject matter relates to flash smelting furnaces, and particularly to burners and feed apparatus for flash smelting furnaces.

BACKGROUND

Flash smelting is a pyrometallurgical process in which a finely ground feed material is combusted with a reaction gas. A flash smelting furnace typically includes an elevated reaction shaft at the top of which is positioned a burner where pulverous feed material and reaction gas are brought together. In the case of copper smelting, the feed material is typically ore concentrates containing both copper and iron sulfide minerals. The concentrates are usually mixed with a silica flux and combusted with pre-heated air or oxygen-enriched air. Molten droplets are formed in the reaction shaft and fall to the hearth, forming a copper-rich matte and an iron-rich slag layer. Much of the sulfur in the concentrates combines with oxygen to produce sulfur dioxide which can be exhausted from the furnace as a gas and further treated to produce sulfuric acid.

A conventional burner for a flash smelter includes an injector having a water-cooled sleeve and an internal central lance, a wind box, and a cooling block that integrates with the roof of the furnace reaction shaft. The lower portion of the injection sleeve and the inner edge of the cooling block create an annular channel. The feed material is introduced from above and descends through the injector sleeve into the reaction shaft. Oxygen enriched combustion air enters the wind box and is discharged to the reaction shaft through the annular channel. Deflection of the feed material into the combustion air is promoted by a bell-shaped tip at the lower end of the central lance. In addition, the tip includes multiple perforation jets that direct compressed air outwardly to disperse the feed material in an umbrella-shaped reaction zone. A contoured adjustment ring is mounted slidingly around the lower portion of the injector sleeve within the annular channel. The velocity of the combustion air can be controlled to respond to different flow rates by raising and lowering the adjustment ring with control rods that extend upwardly through the wind box to increase or reduce the cross-sectional flow area in the annular channel. Such a burner for a flash smelting furnace is disclosed in U.S. Pat. No. 6,238,457.

Known burners of this type are associated with disadvantages that can adversely affect their performance. These include failure to achieve maximal mixing of the feed material with the combustion gas to optimize oxygen efficiency within the reactor. In addition, such burners have limited range of velocity control to optimize the performance of the burner relative to the feed material. Known burners are also associated with uneven distribution of feed material through the injector sleeve, which can also adversely affect their performance.

For example, the control rods that raise and lower the adjustment ring can interfere with the even flow of air through the wind box and impede optimal mixing and combustion. It is also difficult to provide water cooling for the adjustment ring, and the ring has a tendency to become sticky or misaligned on the injector sleeve.

In addition, dispersion of feed material by compressed air is less than optimal because the discreet jets used on known lance tips fail to provide a continuous air curtain.

Moreover, known burner designs fail to include means for monitoring how well centered the injector is within the annular channel, or mechanisms for effectively adjusting the injector without having to shut down the furnace.

It is a goal of the inventors to provide an improved burner and burner feed apparatus for a flash smelting furnace that provides better mixing, more optimal oxygen efficiency, improved control, and ease of maintenance.

SUMMARY

The following summary is intended to introduce the reader to the more detailed description that follows, and not to define or limit the claimed subject matter.

According to one aspect, a burner is provided for a flash smelting furnace. The burner includes a burner block, a wind box, an injector, and an injector surrounding structure. The block integrates with the roof of the furnace, and has an opening therethrough to communicate with the reaction shaft of the furnace. The wind box is mounted over the block and supplies combustion gas to the reaction shaft through the block opening. The injector has a sleeve for delivering pulverous feed material to the furnace and a central lance within the sleeve to supply compressed air for dispersing the pulverous feed material in the reaction shaft. The injector is mounted within the wind box so as to extend through the opening in the block, defining therewith an annular channel through which combustion air from the wind box is supplied into the reaction shaft. The injector surrounding structure extends from the wind box through the opening in the block. One of either the injector surrounding structure and the injector is movable relative to the other by control means exterior of the wind box so as to adjust the cross-sectional area of the annular channel and thereby control the velocity of the combustion air supplied into the reaction shaft.

In some examples the injector surrounding structure is a collar movable by control means exterior of the wind box so as to adjust the cross-sectional area of the annular channel and thereby control the velocity of the combustion air supplied into the reaction shaft. The collar may comprise a plurality of curved fins which pivot to expand or contract the annular channel. Alternatively, the collar may comprise at least one band which can be raised toward or lowered away from an outwardly flared section on the sleeve to increase or reduce the annular channel.

In other examples, the lower portion of the sleeve is upwardly tapered and the injector surrounding structure has a generally corresponding downward taper, and the injector can be raised and lowered by control means exterior of the wind box so as to adjust the cross-sectional area of the annular channel.

According to another aspect, a burner is provided for a flash smelting furnace. The burner includes a burner block, a wind box, an injector, and an injector surrounding structure. The block integrates with the roof of the furnace, and has an opening therethrough to communicate with the reaction shaft of the furnace. The wind box is mounted over the block and supplies combustion gas to the reaction shaft through the block opening. The injector has a sleeve for delivering pulverous feed material to the furnace and a central lance within the sleeve to supply compressed air for dispersing the pulverous feed material in the reaction shaft. The injector is mounted within the wind box so as to extend through the opening in the block, defining therewith an annular channel through which combustion air from the wind box is supplied into the reaction shaft. The upper portion of the sleeve of the injector is mounted to the lower portion of the wind box with respective flanges separated by a compression gasket and provided with leveling adjusters.

According to another aspect, a burner is provided for a flash smelting furnace. The burner includes a burner block, a wind box, an injector, and an injector surrounding structure. The block integrates with the roof of the furnace, and has an opening therethrough to communicate with the reaction shaft of the furnace. The wind box is mounted over the block and supplies combustion gas to the reaction shaft through the block opening. The injector has a sleeve for delivering pulverous feed material to the furnace and a central lance within the sleeve to supply compressed air for dispersing the pulverous feed material in the reaction shaft. The central lance includes an annular slot at its tip for creating a substantially continuous air curtain.

According to another aspect, a burner feed apparatus is provided for a flash smelting furnace. The burner feed apparatus includes a distributor having curved deflector plates that direct the feed stream in an evenly distributed annulus into the burner sleeve.

BRIEF DESCRIPTION OF DRAWINGS

In order that the claimed subject matter may be more fully understood, reference will be made to the accompanying drawings, in which:

FIG. 23 is a more detailed cross-sectional view of the lower portion of the burner of FIG. 22.

FIG. 24 is a more detailed cross-sectional view of the lower portion of the burner of FIG. 22 with the combustion air channel most closed.

DETAILED DESCRIPTION OF EMBODIMENTS

Figure 1:
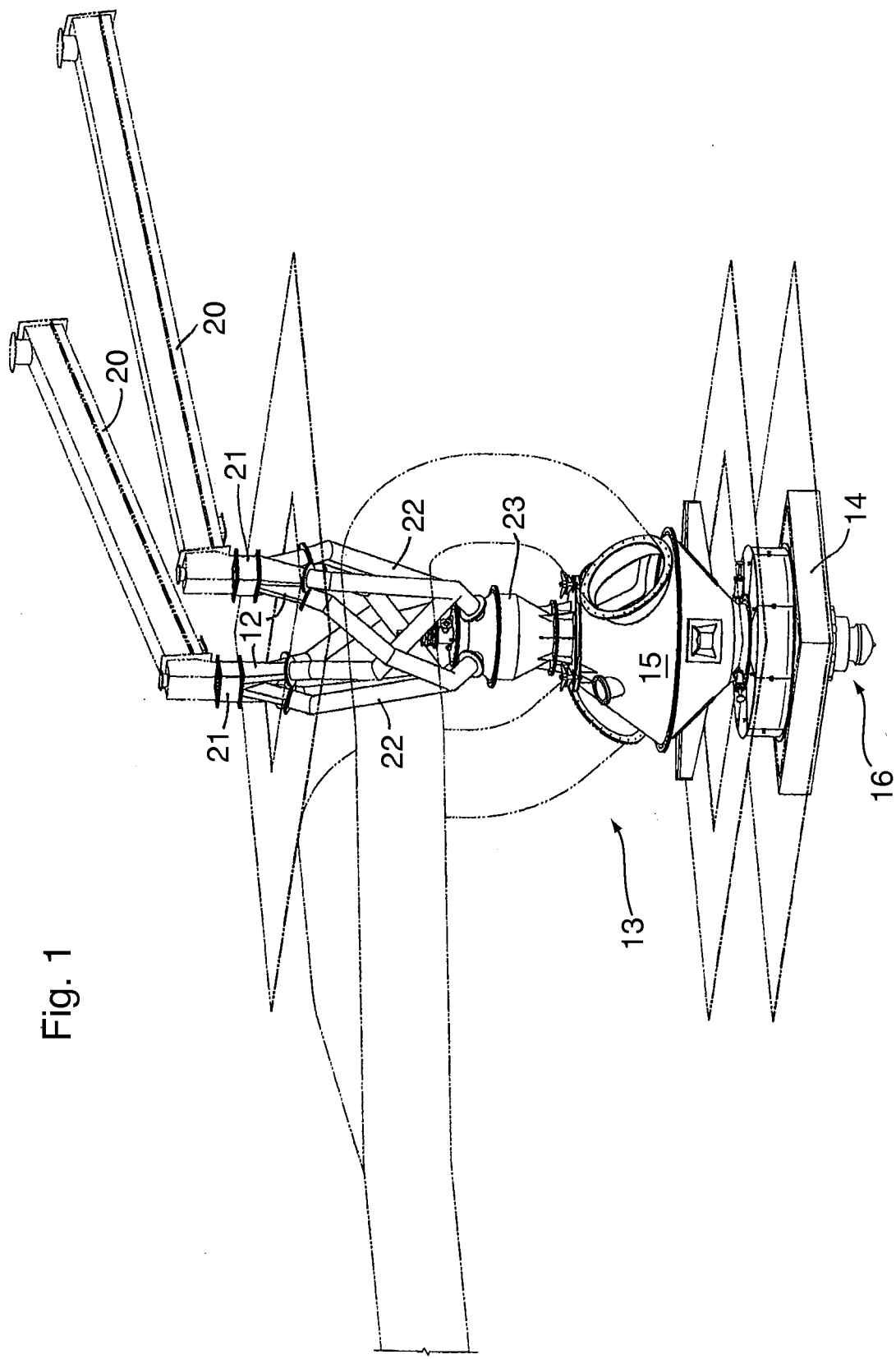
FIG. 1 is an isometric view of a burner assembly and feed apparatus for a flash smelting furnace according to one embodiment.
Figure 2:
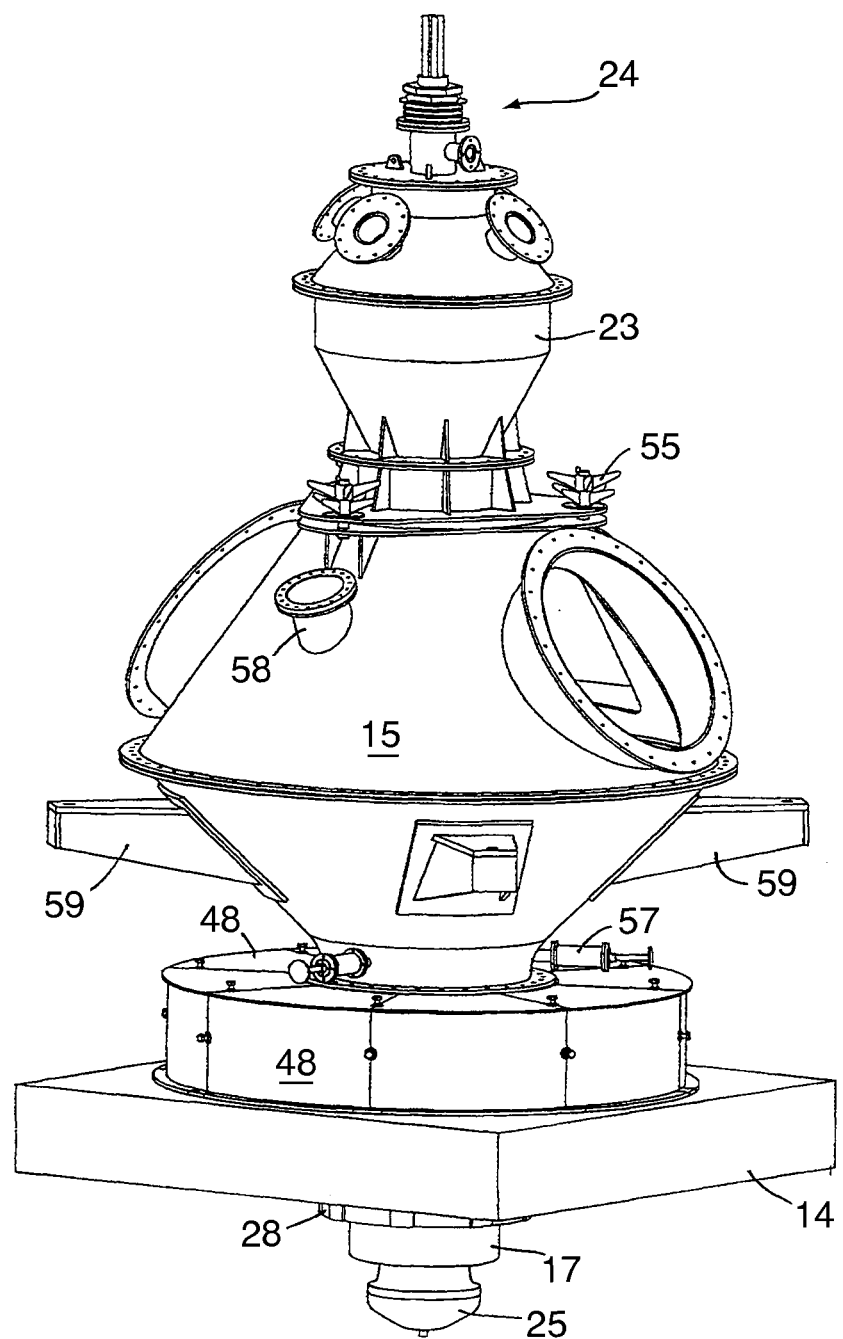
FIG. 2 is an enlarged isometric view of the burner assembly of FIG. 1.

In the following description, specific details are set out to provide examples of the claimed subject matter. However, the embodiments described below are not intended to define or limit the claimed subject matter. It will be apparent to those skilled in the art that many variations of the specific embodiments may be possible within the scope of the claimed subject matter.

As shown in FIGS. 1-4, a burner assembly 13 is positioned above the reaction shaft of a flash smelting furnace. The base of the burner assembly 13 is provided by a block 14 which integrates into the roof of the reaction shaft of the furnace. A wind box 15 is mounted above the block 14 and an injector 16 having a sleeve 17 and a central lance 18 extends through the wind box 15 and through a nozzle opening 19 in the block 14. Above the wind box 15 is the material feed equipment, comprising air slides 20, splitter boxes 21, manifold connectors 12, feed pipes 22, and a distributor 23 which communicates with the sleeve 17 of the injector 16. The central lance 18 of the injector 16 extends upwardly beyond the sleeve 17 through the top of the distributor 23 to a lance head section 24.

Figure 3:
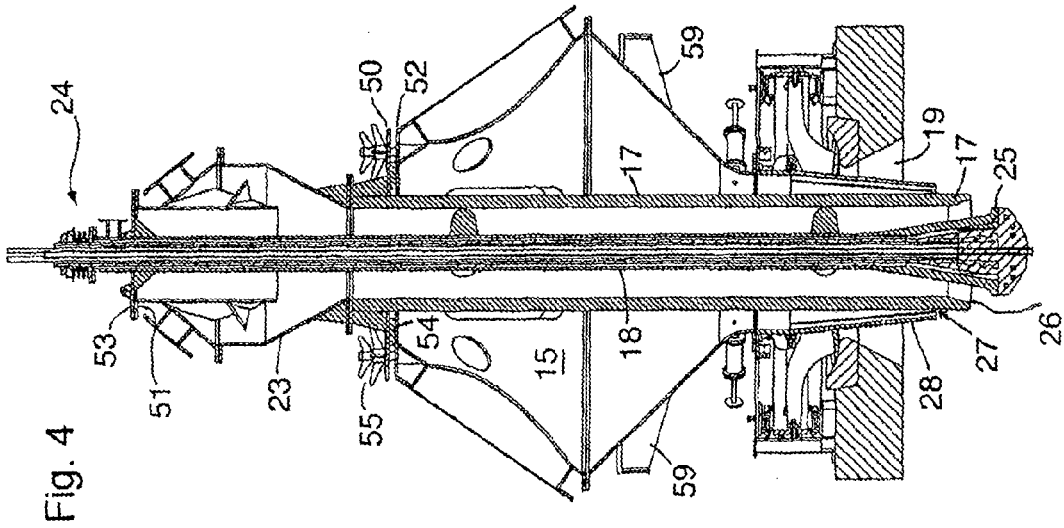
FIG. 3 is a cross-sectional view of the burner assembly of FIG. 2 with the combustion air channel most open.
Figure 4:
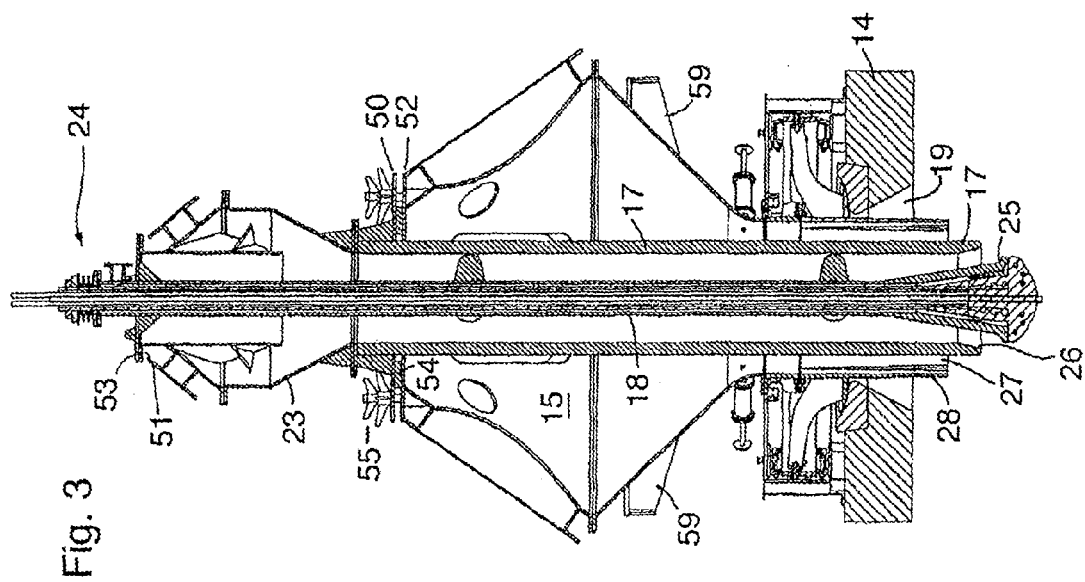
FIG. 4 is a cross-sectional view of the burner assembly of FIG. 2 with the combustion air channel most closed.

As seen in FIGS. 3 and 4, the burner assembly 13 rests on the burner block 14 which provides the main seal between the reaction shaft of the furnace and the burner assembly 13. The block 14 is water-cooled and has multiple ports for access to burner components. The injector sleeve 17 extends into the upper portion of the reaction shaft of the furnace. The central lance 18 has a tip 25 at its lower end which extends below the sleeve 17. The lower rim 26 of the sleeve 17 is inwardly chamfered and the lance tip 25 has a frustoconical shape and together they direct the feed material outwardly. The lance 18 carries compressed air which is directed horizontally from the tip 25. The compressed air further disperses the feed material in an umbrella pattern. The opening 19 of the block 14 and the sleeve 17 define an annular channel through which the combustion air passes from the wind box 15 to the reaction shaft.

The wind box 15 communicates with the reaction shaft through a variable collar 28 within the annular channel 27. The collar 28 provides a nozzle function so that the velocity of the enriched air can be controlled to accommodate different flow rates. As shown in FIGS. 5-9, the collar 28 comprises sixteen curved fins which pivot to expand or contract around the lower portion of the injector sleeve 17. Eight inner fins 29 are tapered and have outwardly extending control arms 30. Eight outer fins 31 overlap with the eight inner fins 29. The inner and outer fins 29, 31 include brackets 46 that rest on a machined insert 47, which is also water cooled, that is fit into the opening 19 of the burner block 14. The eight outer fins 31 are spring loaded to maintain a tight relationship with the eight inner fins 29. The inner fin control arms 30 interact via roller pins 32 with angled slots 33 in a surrounding control ring 34 so that as the control ring 34 is rotated, the outer ends of the fin control arms 30 are raised or lowered, thereby pivoting the eight inner fins 29. In this manner, the collar 28 effectively varies the cross-sectional area of the annular channel 27 between the sleeve 17 and the collar 28.

Figure 9:
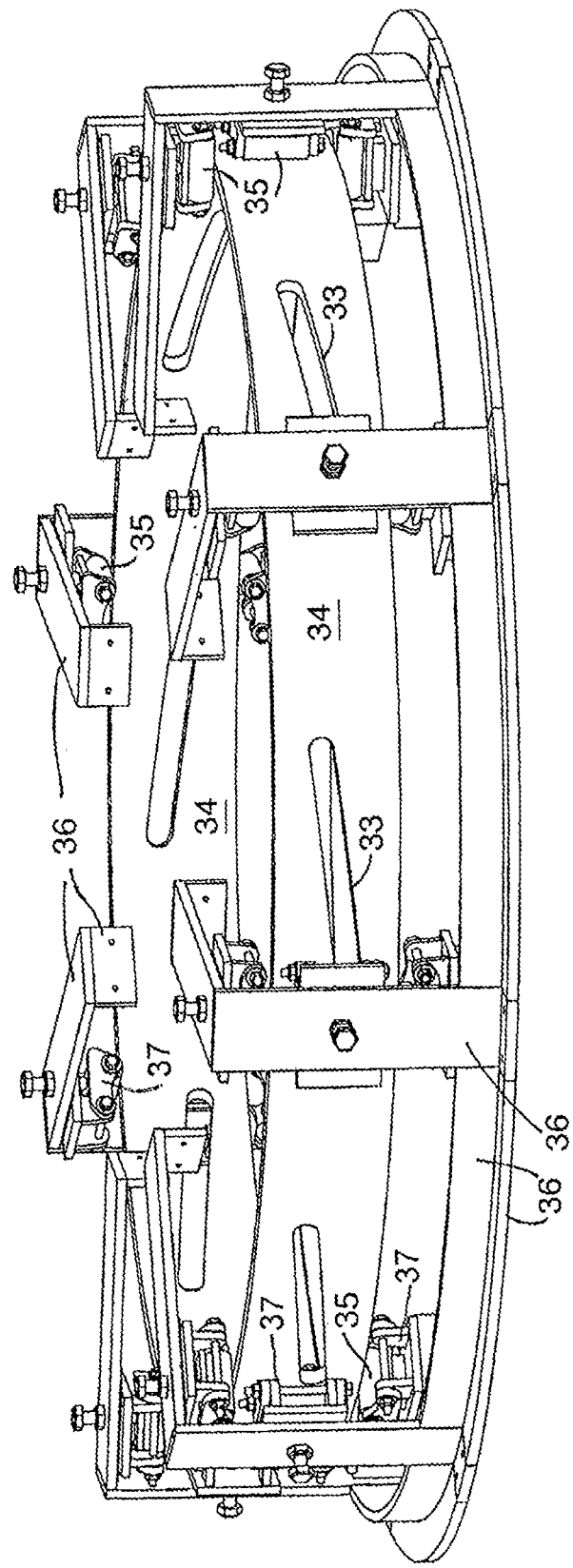
FIG. 9 is an isolated perspective view of a portion of the control ring and support frame for the collar assembly of FIGS. 7 and 8.
Figure 10:
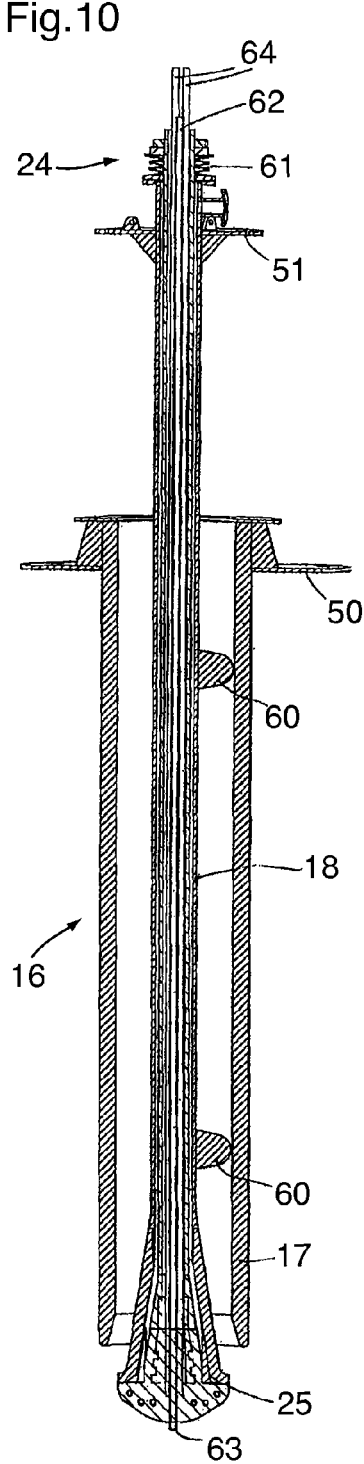
FIG. 10 is an isolated cross-sectional view of the injector of the burner of the previous figures.
Figure 11A:
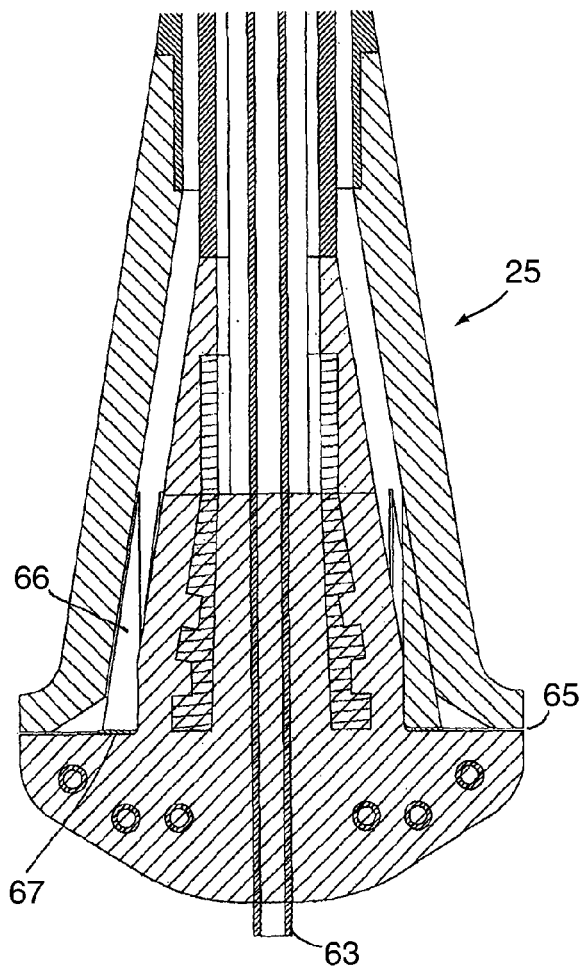
FIG. 11a is a more detailed cross-sectional view of the tip of the injector.
Figure 11B:
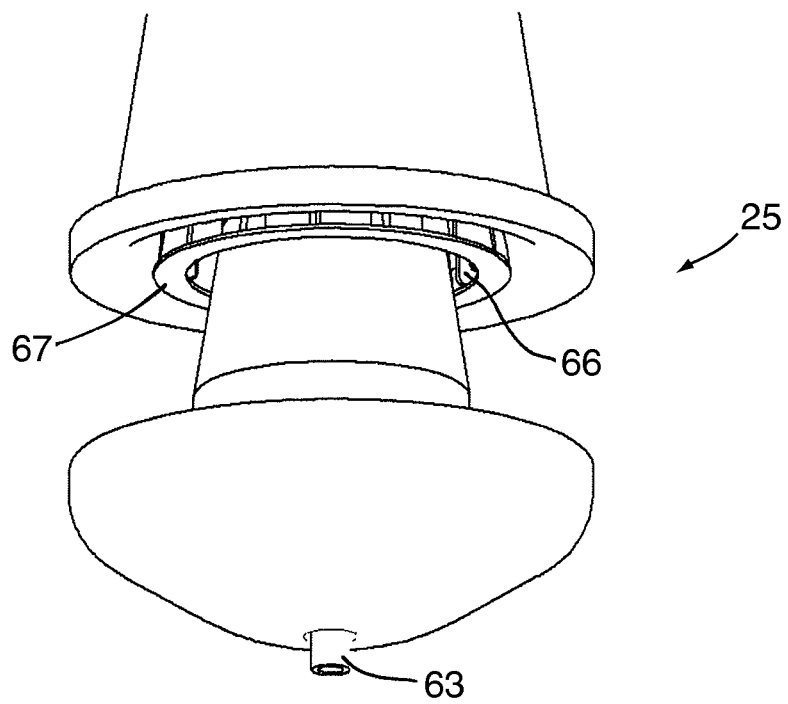
FIG. 11b is an exploded isometric view of the tip of the injector.
Figure 11C:
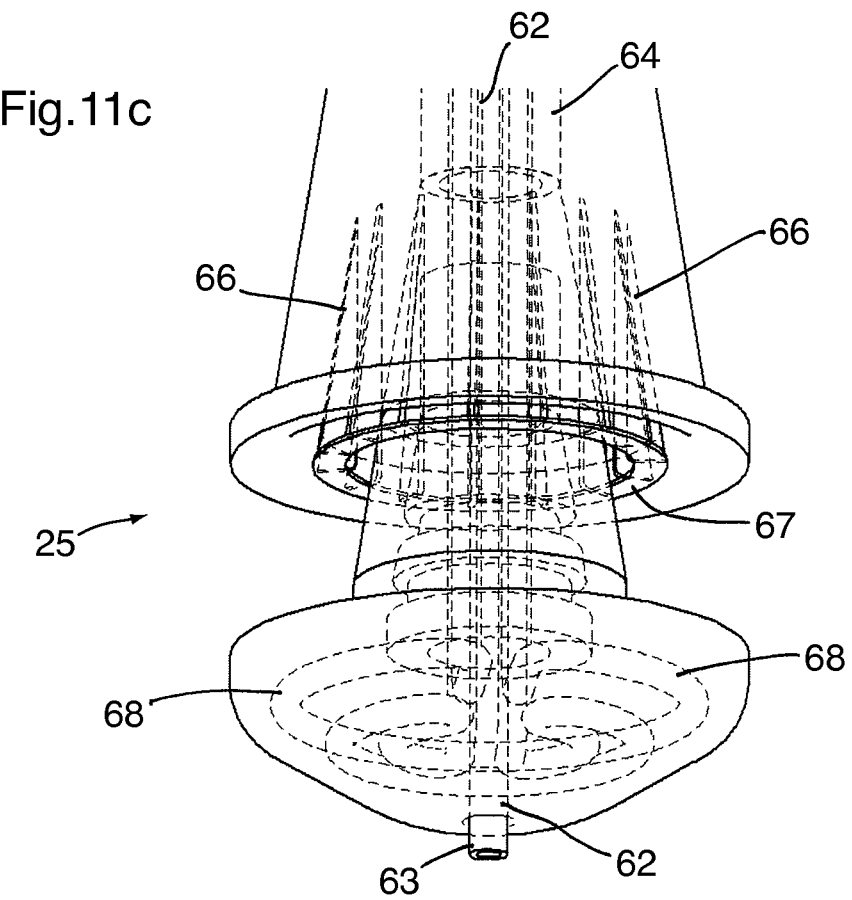
FIG. 11c is a similar isometric view of the tip of the injector, with internal structures shown in dotted lines.
Figure 13:
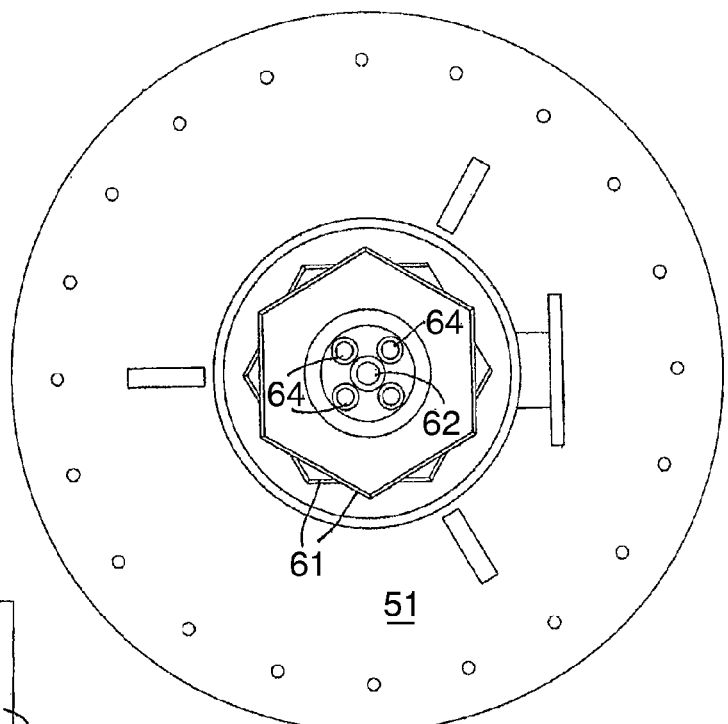
FIG. 13 is a plan view of the upper portion of the injector.
Figure 12:
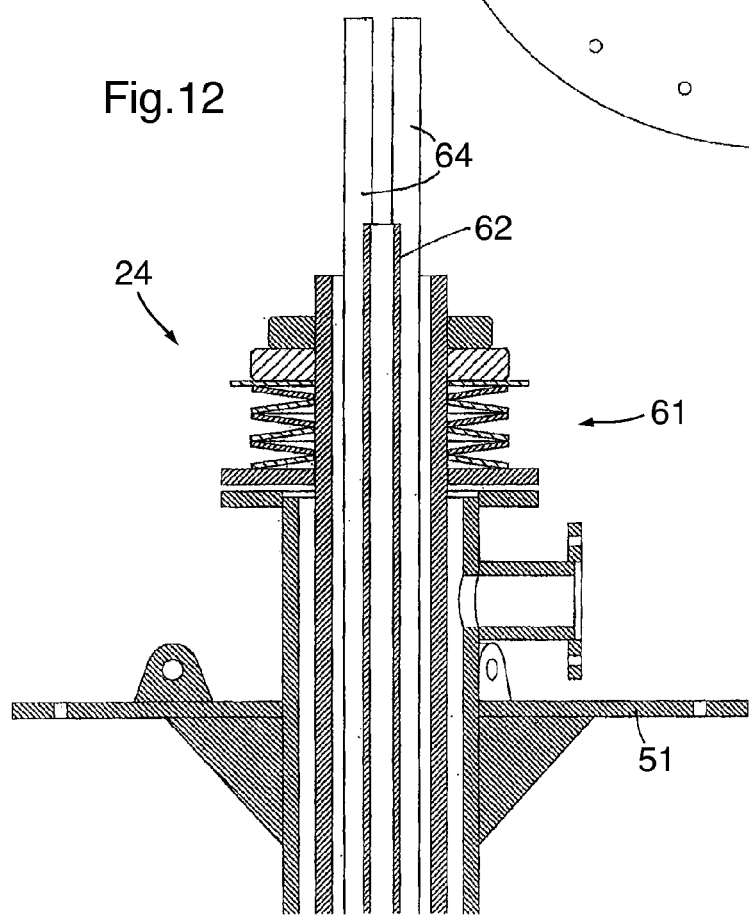
FIG. 12 is a more detailed cross-sectional view of the upper portion of the injector.
Figure 14:
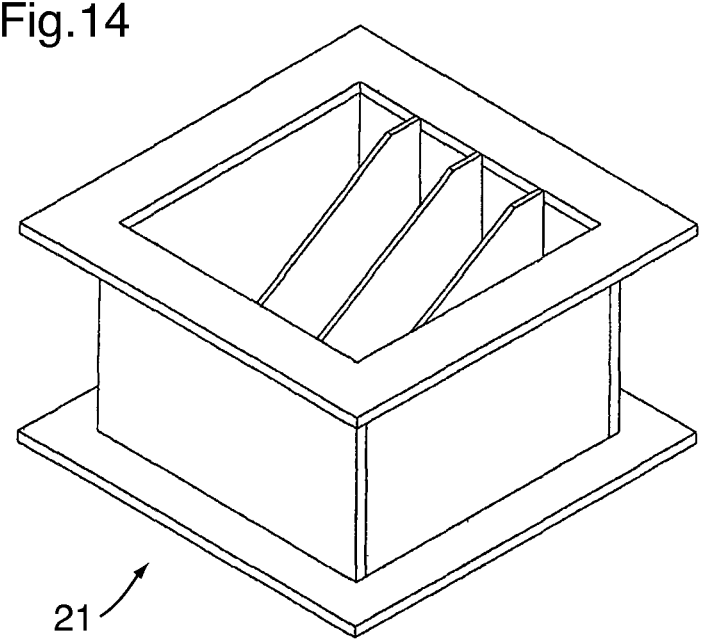
FIG. 14 is an isolated isometric view of a splitter box of the feed apparatus.
Figure 15:
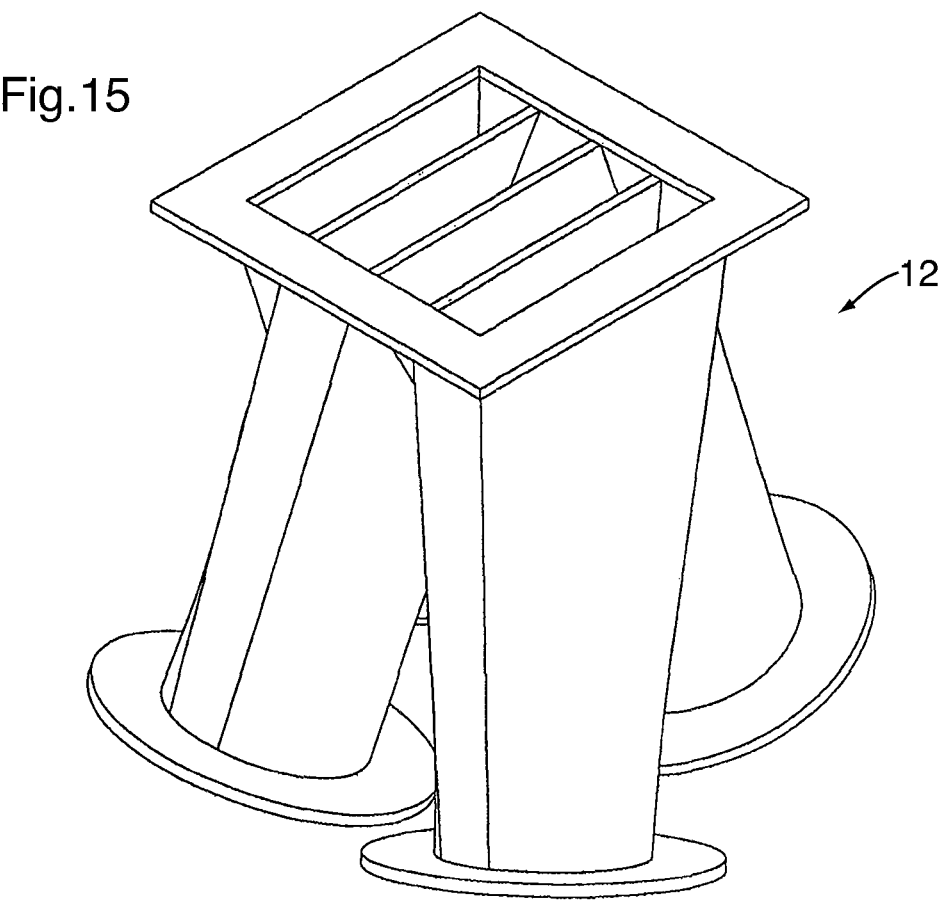
FIG. 15 is an isolated isometric view of a manifold connector of the feed apparatus.
Figure 16:
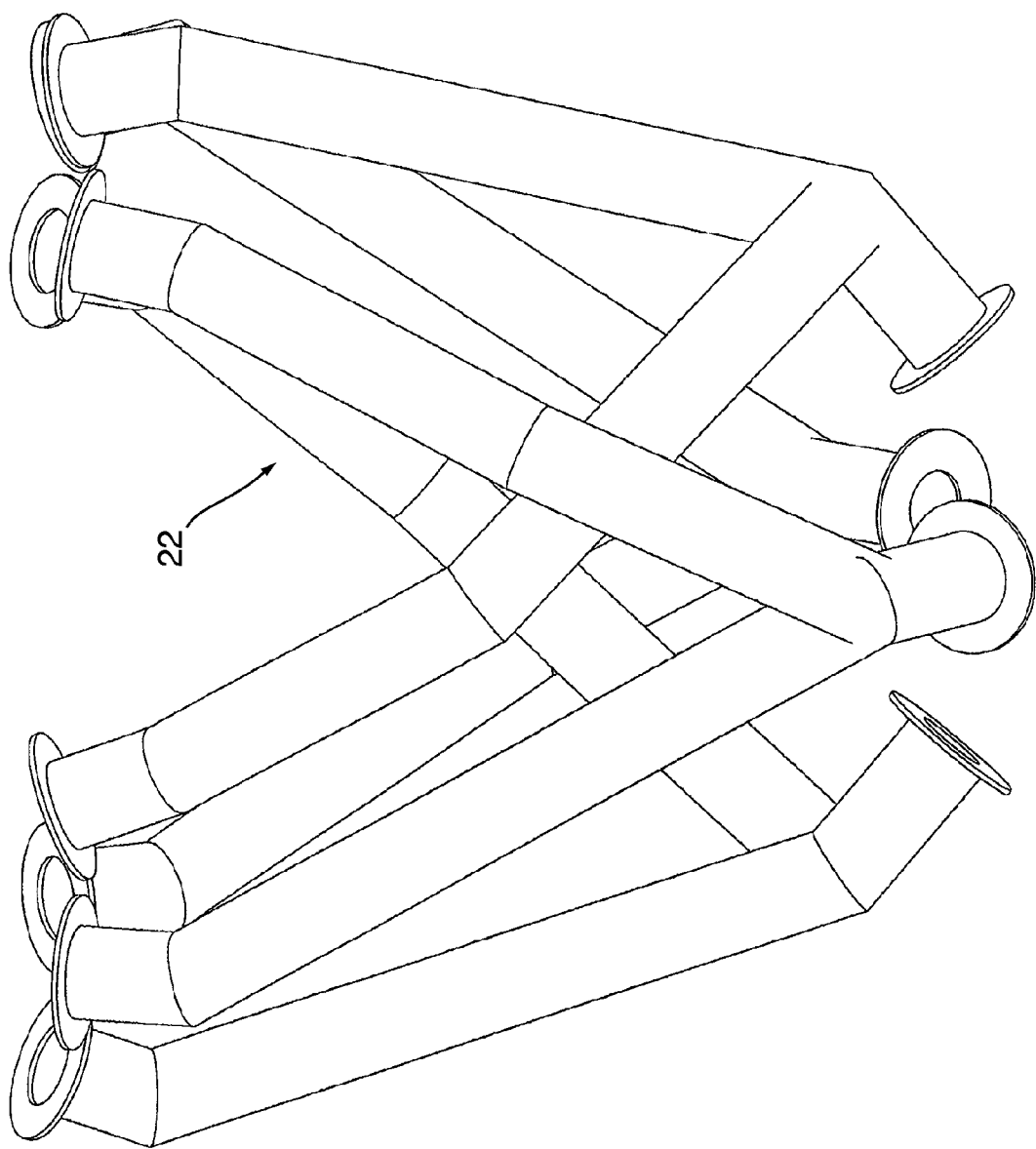
FIG. 16 is an isolated isometric view of the feed pipes of the feed apparatus.
Figure 17:
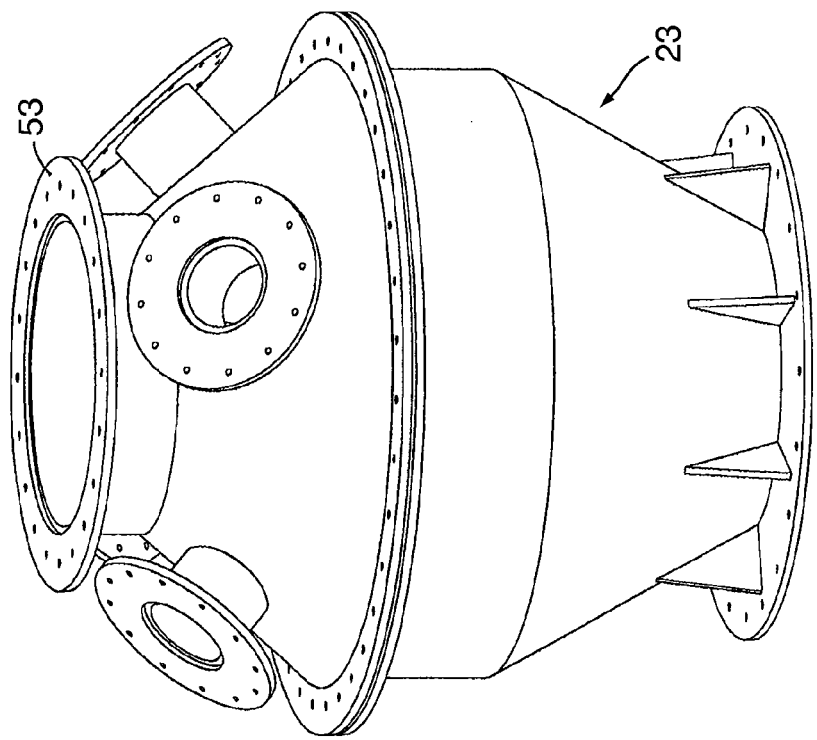
FIG. 17 is an isometric view of the distributor of the feed apparatus.
Figure 18:
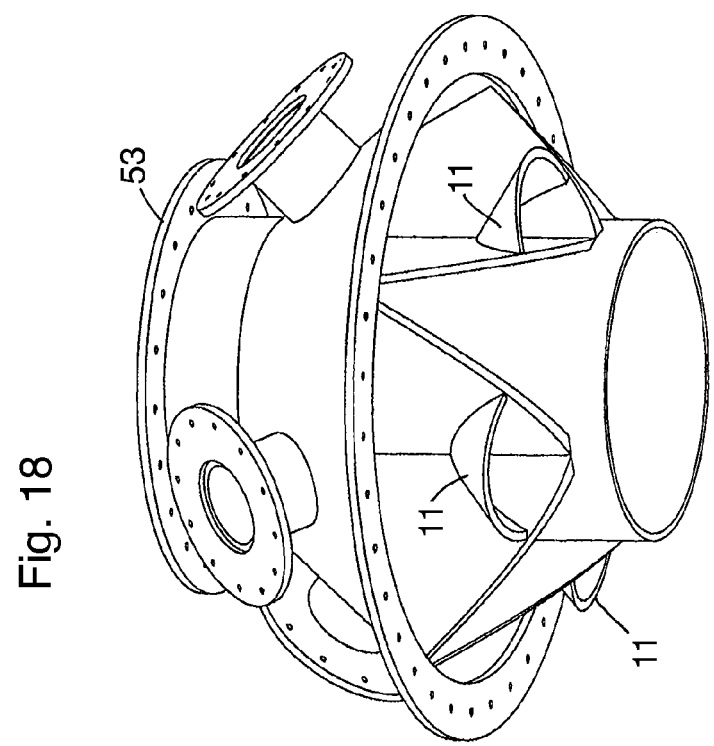
FIG. 18 is an isometric view from below of the upper portion of the distributor of FIG. 17, revealing the interior thereof.

As best seen in FIG. 9, the control ring 34 is held in place by a plurality of rollers 35 positioned on a circular support frame 36 such that the rollers 35 bear on the outer face and the upper and lower edges of the control ring 34. The rollers are journalled in pivot mounts 37 to adjust their position. The control ring 34 can be rotated by means of a worm gear and motor (not shown). Alternatively, the control ring could be rotated by means of a pivot arm assembly or chain and sprocket drive using either hydraulic, pneumatic or electrical actuators.

Figure 5:
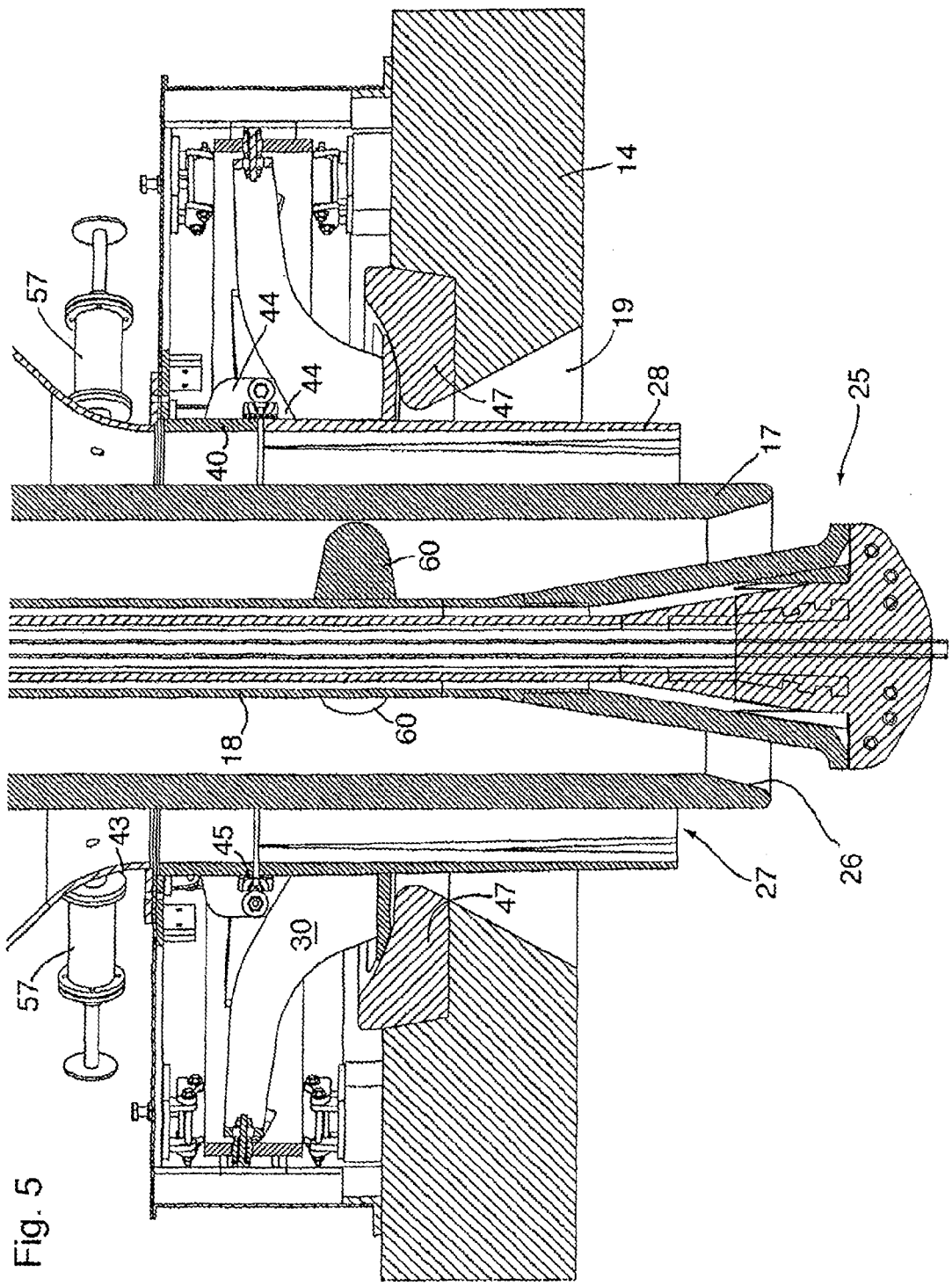
FIG. 5 is a more detailed cross-sectional view of the lower portion of the burner of FIG. 3.
Figure 6:
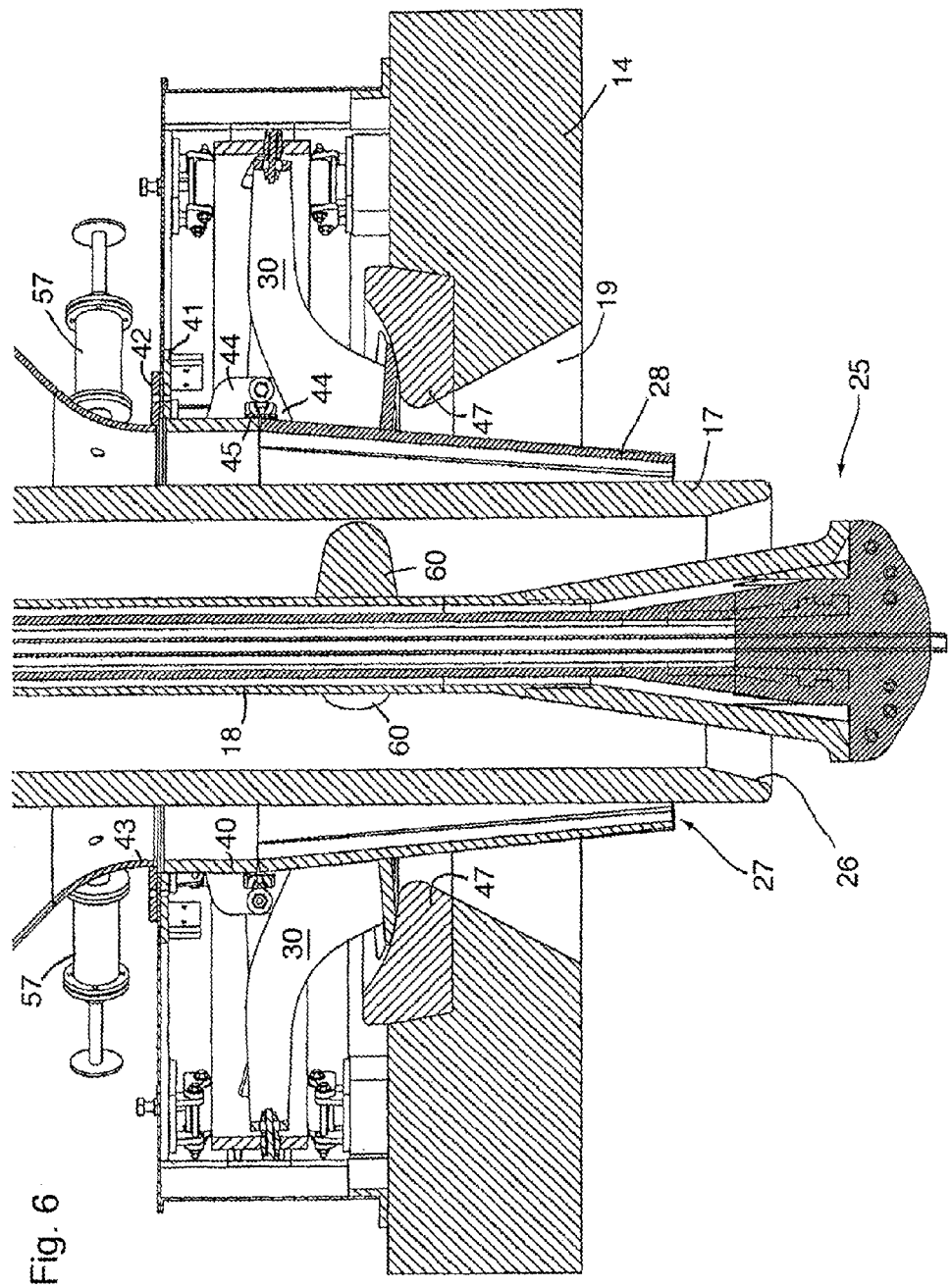
FIG. 6 is a more detailed cross-sectional view of the lower portion of the burner of FIG. 4.
Figure 7:
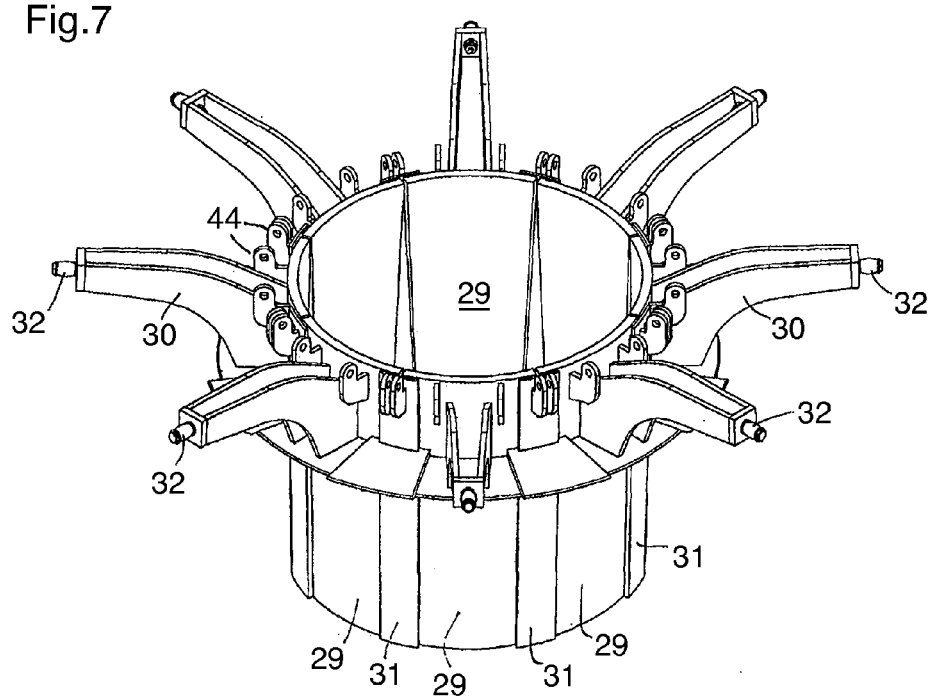
FIG. 7 is an isolated isometric view of a portion of the collar assembly that opens and closes the combustion air channel in the burner of FIGS. 3 and 5.
Figure 8:
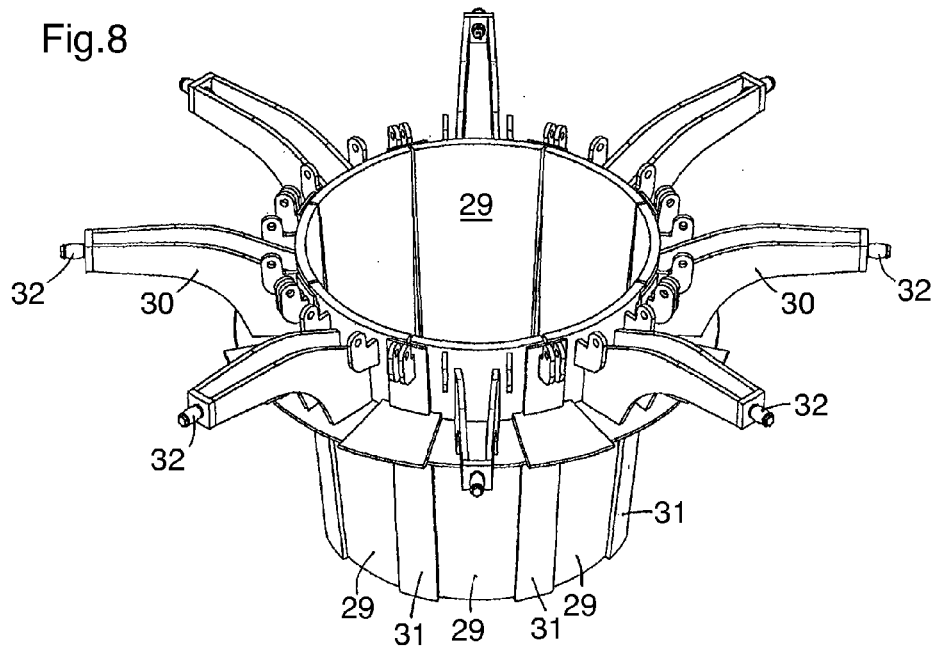
FIG. 8 is an isolated isometric view of a portion of the collar assembly that opens and closes the combustion air channel in the burner of FIGS. 4 and 6.

As seen in FIGS. 5 and 6, the collar 28 includes an upper section 40 having a flange 41 that connects with a corresponding lower flange 42 at the lower rim 43 of the wind box 15. The upper section 40 of the collar 28 connects to the inner and outer fins 29, 31 by means of cooperating lugs 44. A steel tension hoop 45 covers the gap between the upper ring and the fins.

Cover plates 48 are mounted to the control ring support frame 36 to enclose the area. A compressed air inlet is provided to maintain a positive pressure within the enclosure formed by the cover plates to prevent either combustion air or furnace gases from escaping.

As shown in FIGS. 3 and 4, and 10-13, the upper end of the injector sleeve 17 has flanges 50,51 for mounting the injector 16 to corresponding flanges 52,53 on the wind box 15 and the distributor 23. The upper flange 52 of the wind box 15 and the lower flange 50 of the sleeve 17 are separated by a compression gasket 54 and provided with three-point leveling adjusters 55. This allows the injector 16 to be correctly centered to provide equalized air flow through the annular channel 27 between the sleeve 17 and the collar 28. The adjusters 55 consist of three studs welded to the wind box upper flange 52, provided with wing nuts to allow easy adjustment without requiring additional tools.

In addition, as shown in FIGS. 5 and 6, rodding mechanisms 57 are provided at three points on the lower portion of the wind box 15 to give feedback of the alignment of the injector sleeve 17 relative to the collar 28. The sleeve 17 is set during cold installation and the rodding mechanisms 57 are each calibrated to the stroke distance to touch the sleeve 17. The zero point can be checked periodically during furnace campaigns and deviations can be corrected by means of the leveling adjusters 55.

The wind box 15 is a generally biconical barrel shape and provided with inspection ports 58 where the burner flame can be observed, and also where the verticality of the injector 16 can be visually assessed. The wind box 15 is provided with four beams 59 by which the burner assembly 13 is mounted to the support frame of the furnace. Two or more symmetrically arranged inlets may be used to promote symmetric flow of the combustion gas through the nozzle opening 19. The wind box 15 is dimensioned to provide sufficient volume to substantially slow down the incoming combustion gas so that the pressure distribution of the combustion gas is made effectively uniform. A reduction in velocity of between 20% and 90% of the inlet velocity has been found advantageous. This promotes a more even flow through the nozzle. It also buffers out variations in flow rates from multiple inlets. The interior of the wind box 15 is smooth and the lower surface of the wind box 15 merges via a smooth transition to the nozzle opening 19 to promote streamline flow.

Turning to FIGS. 10-13, the central lance 18 of the injector 16 and the sleeve 17 both include internal water cooling. (The interior of the sleeve 17 is not shown but it includes either a water cooling coil or a shell design whereby the water flows down the inside of the shell and up the outside or vice versa.) Cast in place monel tubing 68 provides cooling for the lance tip 25. The lance 18 has small guide wings 60 to keep it centered within the sleeve 17 and is mounted with spring washers 61 to maintain tension. An auxiliary fuel line 62 extends through the lance 18 to a central outlet 63 at the bottom of the tip 25. Cooling lines 64 for the lance 18 are clustered around the auxiliary fuel line 62. The compressed air carried through the lance 18 is discharged through an annular discharge slot 65 that extends around the tip 25 to form an effective continuous air curtain. Gussets 66 and a base ring 67 maintain the gap at a constant cross-section so that the flow is not choked prior to going through the slot 65. The dimension of the gap provided by the slot 65 can be adjusted by replacing the base ring 67 with a thicker or thinner base ring, or by adding shims.

Above the burner assembly 13 is the feed equipment. As seen in FIGS. 14-18, pulverous feed material such as copper sulfide concentrates is charged via air slides 20. Two air slides 20 are provided for redundancy. The feed material passes from each air slide 20 through a splitter box 21 that separates the charge into four equal portions. The outlet of each splitter box 21 passes through a manifold connector 12 where feed pipes 22 are attached. Pairs of feed pipes 22 from each splitter box 20 and manifold connector 12 are combined to provide four charging streams to the feed distributor 23. Each stream of feed material goes into one quadrant of the distributor 23. In each quadrant, the feed stream is distributed evenly by means of a curved plate 11 that directs the feed material evenly around the quadrant of the feed distributor. The feed material then flows in an evenly distributed annulus into the sleeve 17 of the burner injector 16.

Figure 19:
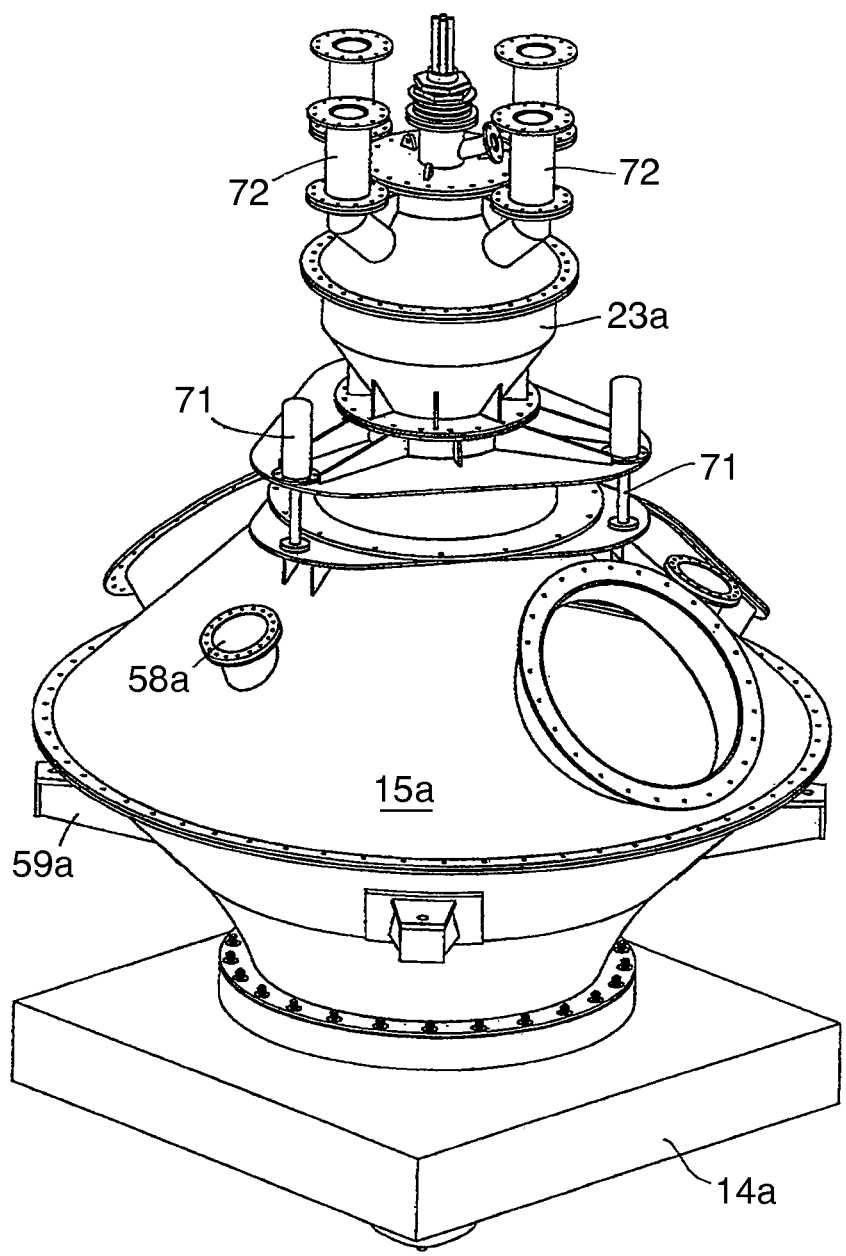
FIG. 19 is a perspective view of a burner assembly according to a second embodiment.
Figure 20:
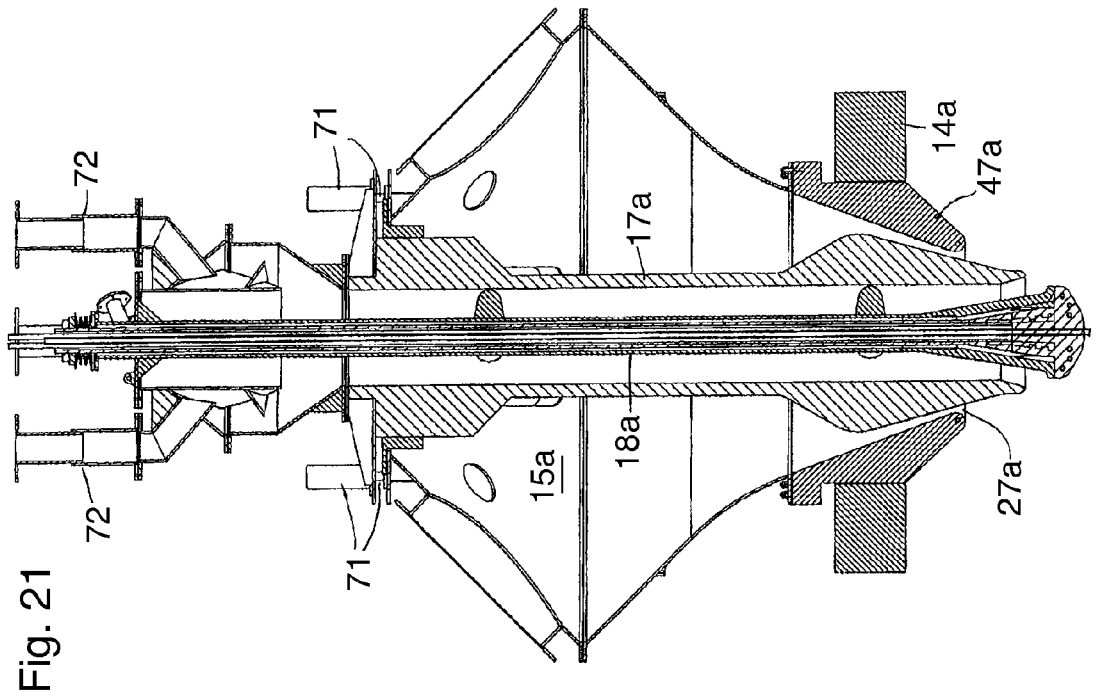
FIG. 20 is a cross-sectional view of the burner assembly of FIG. 19 with the combustion air channel most open.
Figure 21:
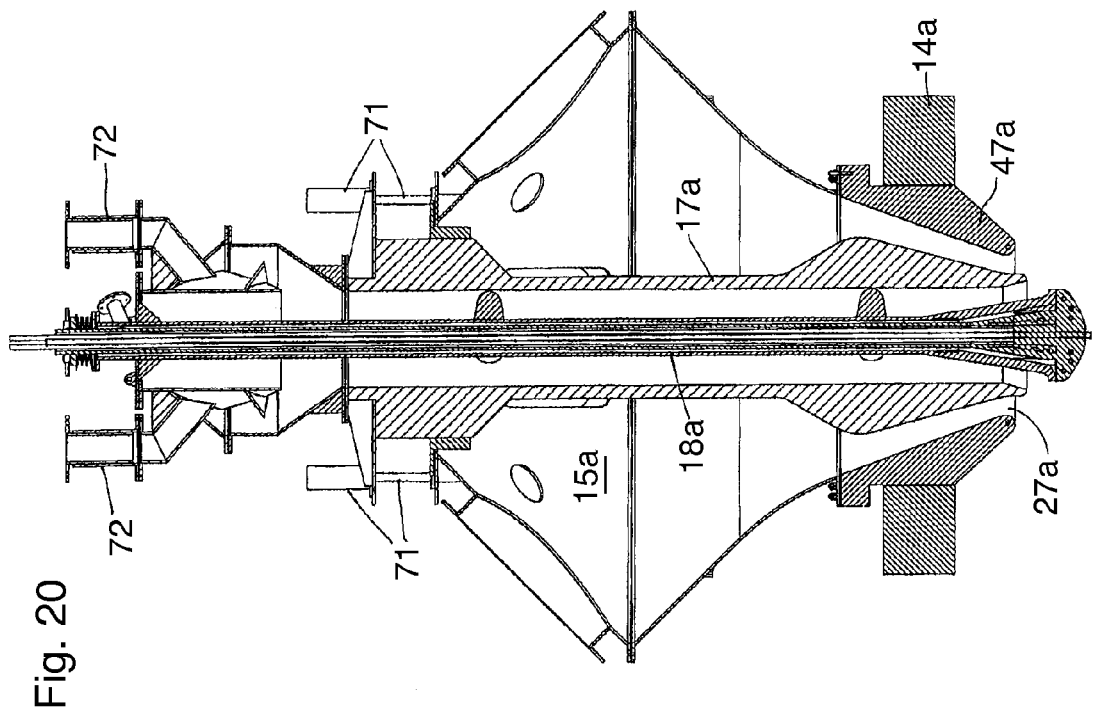
FIG. 21 is a cross-sectional view of the burner assembly of FIG. 19 with the combustion air channel most closed.

Turning to FIGS. 19-21, an alternate embodiment is shown. Similar components are given like names, and like reference numbers followed by the letter "a", and their description will not be repeated.

In this embodiment, the injector sleeve 17a is supported by three mechanical screw actuators 71. The actuators 71 serve to adjust the height of the sleeve 17a as well as to center the injector 16a. They allow for precise raising and lowering of the sleeve 17a when they are moved in unison, and they allow for centering of the injector 16a when they are controlled separately. The centering can be automated by having three feedback sensors that provide feedback of the relative height of each of the actuators 71 to the controller. The sensors may be yo-yo type sensors or other sensors such as optical sensors.

The wall of the lower portion of the injector sleeve 17a is enlarged to present an upward taper to its outer surface, while the inner surface of the insert 47a is tapered downwardly at a similar but shallower angle. The annular channel 27a between the injector sleeve 17a and the block insert 47a is in its most open position when the actuators 71 are fully extended. At this point, the sleeve 17a is at its highest position and the cross-sectional area through which the combustion air enters the reaction shaft is at its maximum. As the actuators 71 are lowered, the sleeve 17a is also lowered, which gradually closes off the cross-sectional area where the combustion air enters the reaction shaft. When the actuators 71 are retracted, the sleeve 17a is at its lowest position and the annular area through which the enriched air enters the reaction shaft is at its minimum. In this way the cross-sectional area of the annular channel 27a can be adjusted, which in turn adjusts the velocity of the combustion air enters the reaction shaft.

As the injector sleeve 17a moves, the injector 16a and the distributor 23a move as well. The feed pipes 22a, however, do not move. The linear motion is accommodated through the use of four expansion joints 72 attached to the inlets of the charge distributor 23a and the outlets of the feed pipes 22a.

Figure 22:
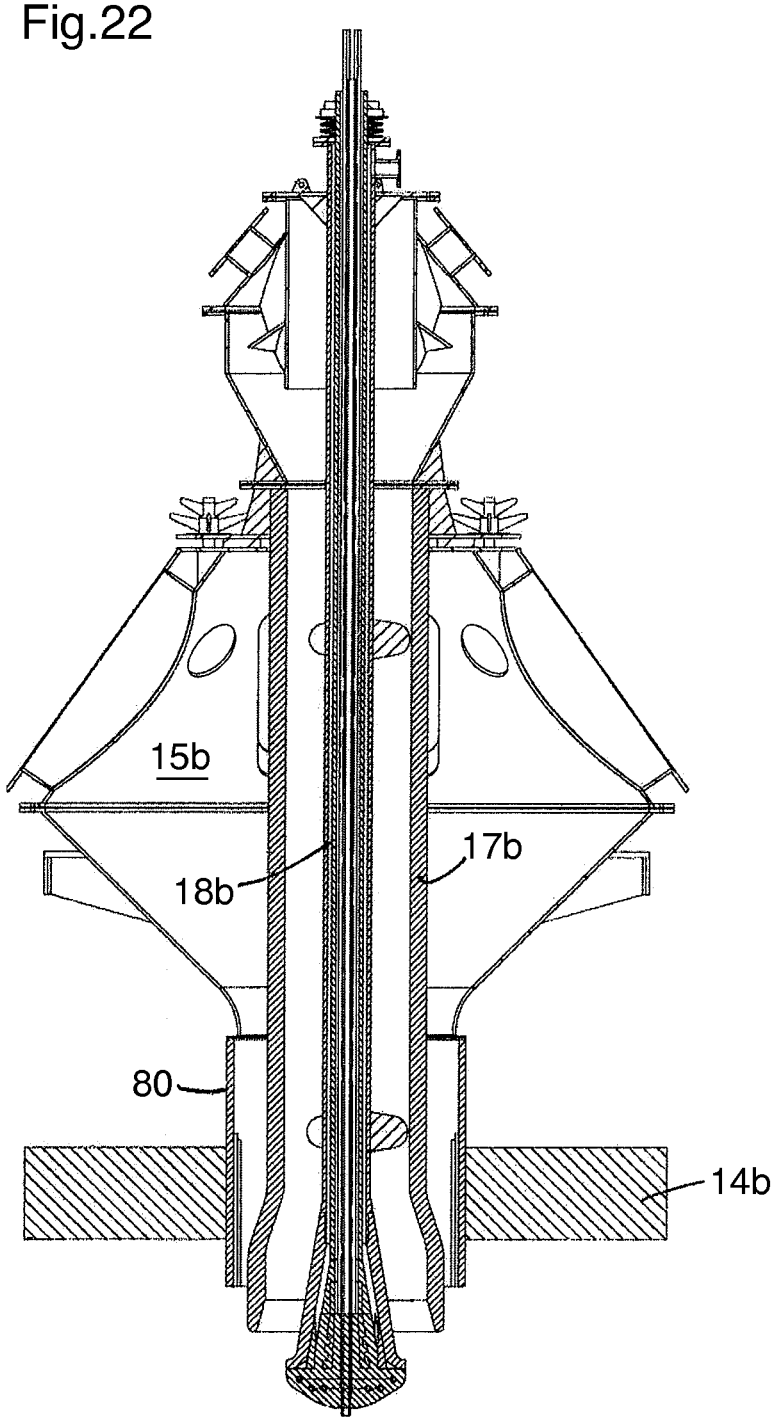
FIG. 22 is a cross-sectional view of a burner assembly according to a third embodiment with the combustion air channel most open.
Figure 25:
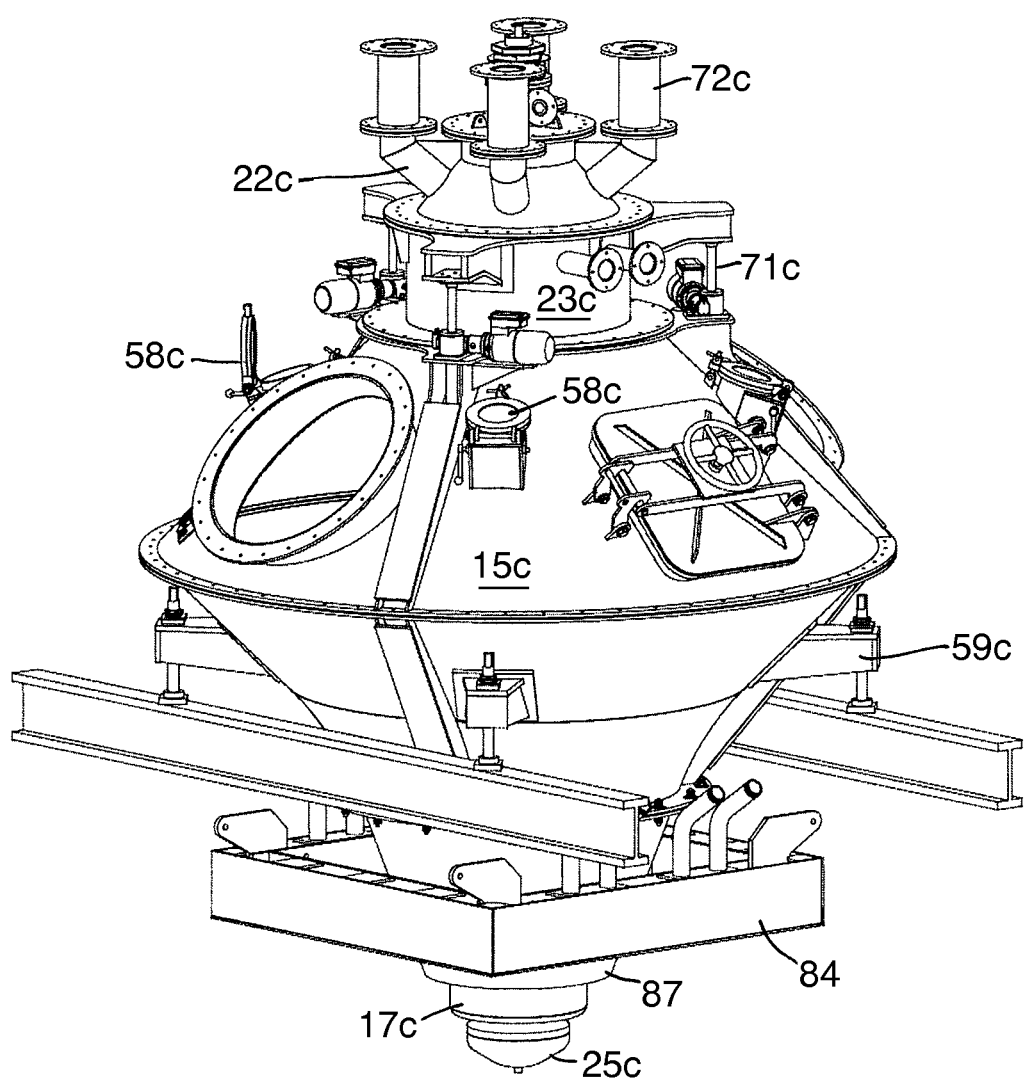
FIG. 25 is a perspective view of a burner assembly according to a fourth embodiment.
Figure 26:
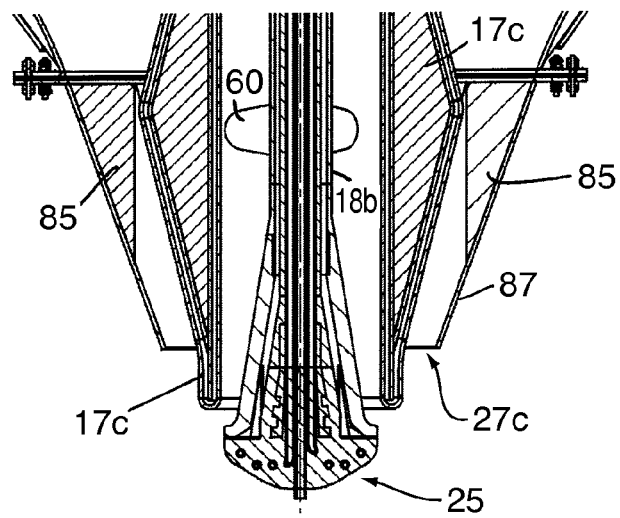
FIG. 26 is a cross-sectional view of the lower portion of the injector of the burner of FIG. 25.
Figure 27:
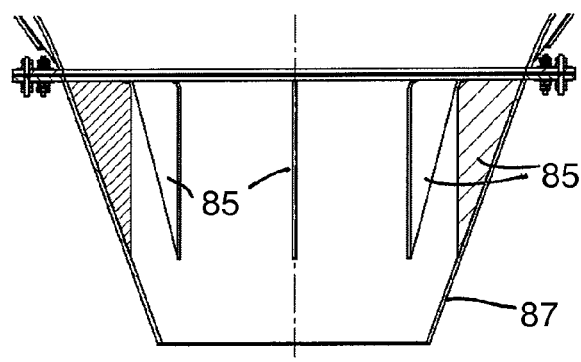
FIG. 27 is a more detailed cross-sectional view of the connection surrounding the injector of the burner of FIG. 25.
Figure 28:
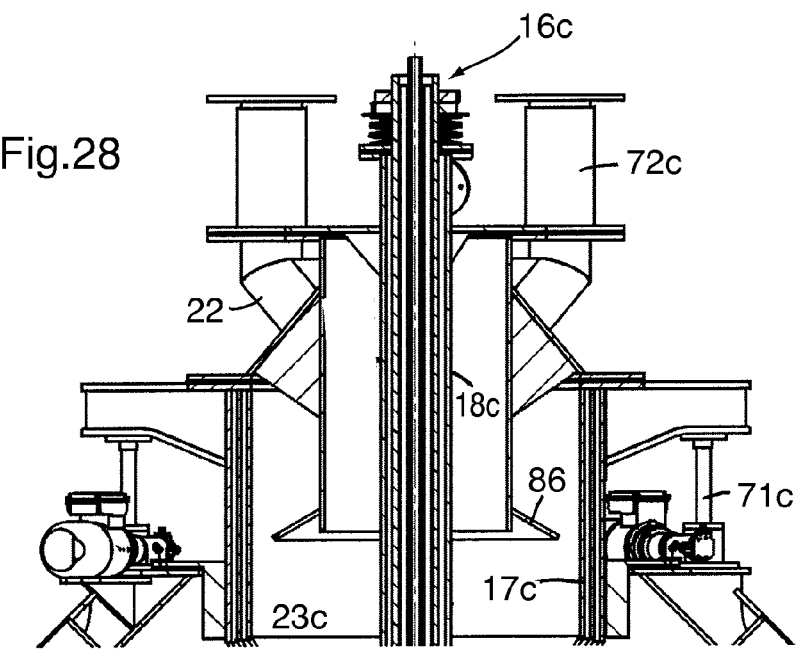
FIG. 28 is a cross-sectional view of the feed distributor of the burner of FIG. 25.

Turning to FIGS. 22-24, a third embodiment is shown. Similar components are given like names, and like reference numbers followed by the letter "b", and their description will not be repeated.

In this embodiment, the lower portion of the sleeve 17b has a bell shape with a downwardly flared section 81 terminating in a generally straight lower rim section 82. A generally straight and cylindrical outer collar 80 extends from the block 14b to the wind box 15b. Within the outer collar 80 are mounted a plurality of sliding bands 83. The sliding bands are raised and lowered by actuators (not shown) that are exterior to the insert 47b and exterior to the wind box 15.

The annular channel 27b between the injector sleeve 17b and the block insert 47b is in its most open position when the sliding bands are fully raised. At this point, the cross-sectional area through which the combustion air enters the reaction shaft is at its maximum. As the sliding bands are lowered, the cross-sectional area where the combustion air enters the reaction shaft is reduced. When the sliding bands are at their lowest position the annular area through which the enriched air enters the reaction shaft is at its minimum. In this way the cross-sectional area of the annular channel 27b can be adjusted, which in turn adjusts the velocity of the combustion air enters the reaction shaft.

Turning to FIGS. 25-29c, a further embodiment is shown. Similar components are given like names, and like reference numbers followed by the letter "c", and their description will not be repeated.

In this embodiment, the burner block 84 is a fabricated steel and stainless steel double walled construction with water cooling. The wind box 15c connects to the block 84 with a tapered connection 87 that surrounds the lower portion of the injector 16c

The distributor 23c mounts lower, partially within the wind box 15c, to reduce the overall height of the burner. The distributor 23c has no quadrant partitions and instead of curved plates, the feed material is deflected evenly around the injector sleeve 17c with a frustoconical skirt 86. The wind box 15c connects with the block 84 through the tapered connection 87. The injector sleeve 17c is enlarged at its lower portion to present an upward taper to its outer surface. The inner surface of the connection 87 is similarly tapered but at a shallower angle. The annular channel 27c between the injector sleeve 17c and the connection 87 is adjusted by raising and lowering the injector sleeve 17c by means of actuators 71c. Fins 85 within the connection 87 help to maintain the concentricity and verticality of the injector 16c. The fins 85 also aid in reducing turbulence of the airflow. The connection 87 may be made of a ceramic material, or may be coated with ceramic or other refractory to protect it from the heat of the reaction shaft.

Figure 29A:
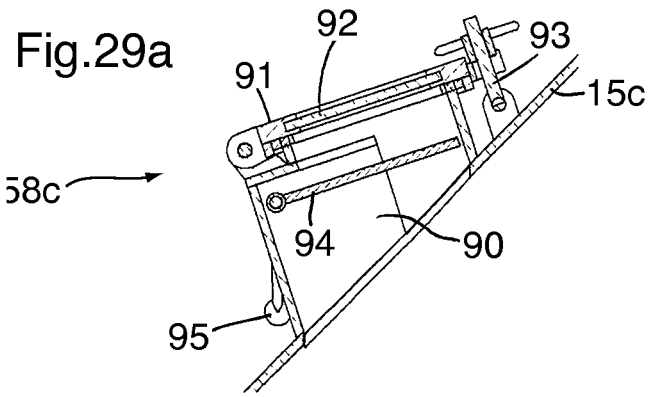
FIG. 29a is a cross-sectional view of an inspection port of the burner of FIG. 25, with both its internal guard and external cover in their closed positions.
Figure 29B:
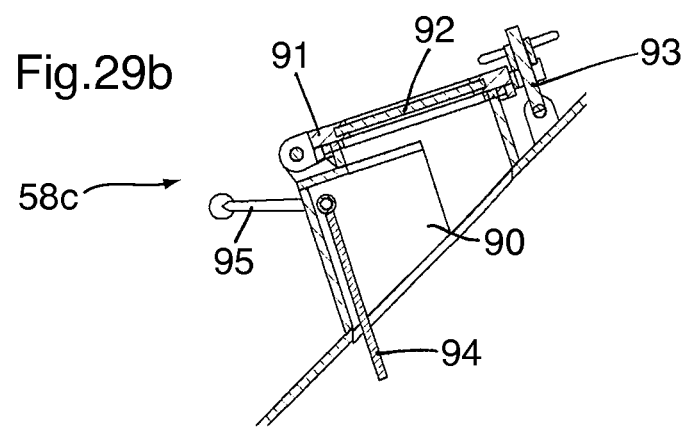
FIG. 29b is a cross-sectional view of the same inspection port with its internal guard in its open position and its external cover in its closed position.
Figure 29C:
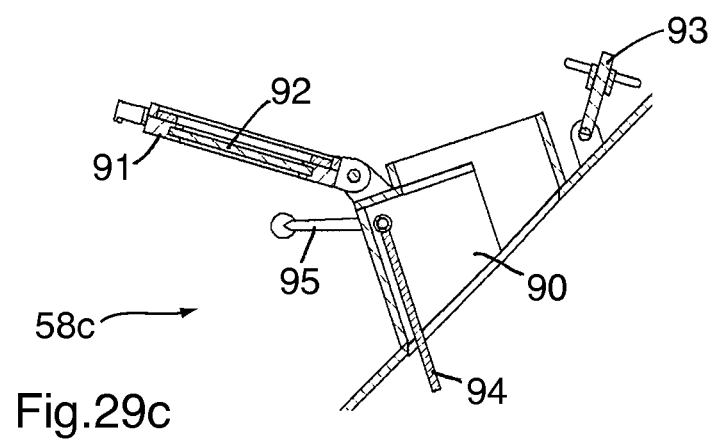
FIG. 29c is a cross-sectional view of the same inspection port with both its internal guard and external cover in their open positions.

Turning to FIGS. 29a, 29b and 29c, each of the inspection ports 58c includes a cylindrical casing 90 having a hinged cover 91 that holds the sight glass 92. The hinged cover can be locked in place by means of a latch 93, or can be opened, for example, to allow operators to take measurements. The latch 91 includes a screw mechanism which can be used to ensure that the cover is closed tightly, so as to compress a gasket between it and the casing 90 to create a seal. An interior guard 94 protects the inside of the sight glass 92. The guard 94 can pivot by means of a handle 95. The handle 95 is heavier than the guard 94 and is oriented so that the force of gravity acting on the handle 95 will bias the guard 94 to its closed position. When an operator wishes to view inside the burner, the operator pulls up on the handle 95 which rotates the guard 94 downwardly and out of the way.

It will be appreciated by those skilled in the art that many variations are possible within the scope of the claimed subject matter. The embodiments that have been described above are intended to be illustrative and not defining or limiting. For example, the collar of the third embodiment could be a single piece that can be moved up and down to increase or decrease the cross-sectional area of the annular channel and thereby control the velocity of the combustion air entering the reaction shaft. In addition, the tip of the lance could be provided with additional compressed air ports to aid in fluidizing the descending feed material above the air curtain.

The invention claimed is:

1. A burner for a flash smelting furnace having a reaction shaft, comprising:
    a burner block that integrates with the roof of the furnace, the block having a nozzle opening therethrough to communicate with the reaction shaft of the furnace;
    a wind box to supply combustion gas to the reaction shaft through the nozzle opening at a controllable velocity, the wind box being mounted over the nozzle;
    an injector having a sleeve for delivering pulverous feed material to the furnace and having a central lance within the sleeve to supply compressed air for dispersing the pulverous feed material in the reaction shaft, the injector mounting within the wind box so as to extend through the nozzle opening in the block, defining therewith an annular channel through which combustion gas from the wind box is supplied into the reaction shaft, the annular channel having a cross-sectional area transverse to the axis of the injector and the nozzle opening; and
    an injector surrounding structure extending from the wind box through the nozzle opening in the block;
    wherein one of the surrounding structure and the injector is movable relative to the other by control means exterior of the wind box so as to adjust the cross-sectional area of the annular channel and thereby control a velocity of the combustion gas supplied into the reaction shaft.

2. The burner of claim 1 wherein the injector surrounding structure is a collar movable by control means exterior of the wind box so as to adjust the cross-sectional area of the annular channel and thereby control the velocity of the combustion gas supplied into the reaction shaft.

3. The burner of claim 2 wherein the collar comprises a plurality of curved fins which pivot to expand or contract the annular channel.

4. The burner of claim 3 wherein the curved fins are activated by a rotating control ring.

5. The burner of claim 4 wherein the curved fins comprise a plurality of inner fins and a plurality of outer fins that overlap the inner fins.

6. The burner of claim 5 wherein the outer fins have control arms that interact with the rotating control ring.

7. The burner of claim 2 wherein the sleeve has an outwardly flared section and the collar comprises at least one band which can be raised toward or lowered away from the outwardly flared section to increase or reduce the annular channel.

8. The burner of claim 7 wherein the collar has a plurality of concentric sliding bands.

9. The burner of claim 1 wherein the lower portion of the sleeve is upwardly tapered and the injector surrounding structure has a generally corresponding downward taper, and
wherein the injector can be raised and lowered by control means exterior of the wind box so as to adjust the cross-sectional area of the annular channel.

10. The burner of claim 9 wherein the injector is movable by actuators that are mounted above the wind box.

11. The burner of claim 9 wherein the actuators can be controlled to centre the injector within the surrounding structure.

12. The burner of claim 1,
wherein an upper portion of the sleeve of the injector and a lower portion of the wind box are each provided with respective flanges and wherein the upper portion of the sleeve of the injector is mounted flange to flange on the lower portion of the wind box with respective flanges separated by a compression gasket and provided with leveling adjusters.

13. The burner of claim 12 wherein the leveling adjusters include studs on one of the flanges provided with tightening nuts.

14. The burner of claim 12 further comprising rodding mechanisms calibrated during installation to establish a center position for the injector sleeve within the annular channel.

15. The burner of claim 9 wherein the surrounding structure has inwardly extending projections to restrain the injector from lateral deviation.

16. The burner of claim 9 wherein the surrounding structure comprises a water-cooled casting that inserts within the burner block.

17. The burner of claim 9 wherein the surrounding structure comprises a tapered connection extending from the burner block to the wind box.

18. The burner of claim 17 wherein the connection is made of a refractory or refractory-coated material.

* * * * *